(12) United States Patent
Fonder et al.

(10) Patent No.: US 8,570,210 B1
(45) Date of Patent: Oct. 29, 2013

(54) AIRCRAFT MIMO RADAR

(75) Inventors: Gregory P. Fonder, Medford, NJ (US); Arul Manickam, Philadelphia, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 179 days.

(21) Appl. No.: 13/165,161

(22) Filed: Jun. 21, 2011

(51) Int. Cl.
*G01S 13/90* (2006.01)

(52) U.S. Cl.
USPC ........................................................ 342/25 B

(58) Field of Classification Search
USPC ..................................... 342/25 R, 25 A–25 F
See application file for complete search history.

(56) References Cited

U.S. PATENT DOCUMENTS

| | | | |
|---|---|---|---|
| 3,864,682 A * | 2/1975 | Maier | 342/424 |
| 4,139,848 A * | 2/1979 | Maxwell, Jr. | 342/30 |
| 4,551,724 A * | 11/1985 | Goldstein et al. | 342/25 C |
| 4,912,477 A * | 3/1990 | Lory et al. | 342/373 |
| 4,990,922 A * | 2/1991 | Young et al. | 342/52 |
| 5,087,916 A * | 2/1992 | Metzdorff et al. | 342/64 |
| 5,136,295 A * | 8/1992 | Bull et al. | 342/15 |
| 5,506,590 A * | 4/1996 | Minter | 342/462 |
| 5,552,788 A * | 9/1996 | Ryan et al. | 342/30 |
| 8,248,298 B2 * | 8/2012 | Lalezari | 342/179 |
| 8,299,958 B2 * | 10/2012 | Kemkemian et al. | 342/107 |
| 8,305,256 B1 * | 11/2012 | Manickam et al. | 342/111 |
| 2008/0291096 A1 * | 11/2008 | Cortambert | 343/705 |
| 2011/0140949 A1 * | 6/2011 | Lee | 342/28 |
| 2011/0221625 A1 * | 9/2011 | Cornic et al. | 342/29 |
| 2011/0248881 A1 * | 10/2011 | Kemkemian et al. | 342/156 |
| 2013/0113652 A1 * | 5/2013 | Smits et al. | 342/174 |

FOREIGN PATENT DOCUMENTS

RU      2192653 C1 * 11/2002

OTHER PUBLICATIONS

Chen, Chun-Yang, Vaidyanathan, P.P., a Subspace Method of MIMO Radar Space-Time Adaptive Processing, California Institute of Technology Electrical Engineering/DSP Lab, ICASSP 2007 Student Paper Contest, International Conference on Acoustics, Speech and Signal Proc., Honolulu, HI, Apr. 2007.

\* cited by examiner

*Primary Examiner* — John B Sotomayor
(74) *Attorney, Agent, or Firm* — Howard IP Law Group, PC

(57) ABSTRACT

Traditional airborne radar antennas are typically limited to placement above or below the aircraft, or in one or both of the wings, or in the nose. In the both-wing case, the fuselage prevents coherent array processing of both wing arrays without the introduction of grating lobes. Both wing arrays are coherently combined without grating lobes through appropriate geometric configurations of the arrays and the use of MIMO processing techniques. A virtual array is formed by convolving the transmit and receive apertures to fill in the gap created by the fuselage, thereby allowing fully coherent array processing and greater angular resolution than previously achievable through a conformal array. The signal-to-noise ratios are potentially improved.

20 Claims, 6 Drawing Sheets

AIRCRAFT MIMO RADAR

BACKGROUND OF THE DISCLOSURE

The use of radar systems on aircraft for detecting other aircraft arose almost as soon as radar itself was devised, and that use has expanded to detection of ground targets. Range and clutter advantages arise from operating a radar system from a high and open location free from obstacles. The shape and aerodynamic requirements of aircraft make it difficult to attach the necessary antennas to the aircraft. Additionally, the antenna(s) must be suitable for both of the major radar functions which are required, namely volume search to identify targets anywhere in the relevant airspace, and tracking to maintain contact with particularly important targets. The types of antennas for these different functions are different.

Airborne Warning and Control System (AWACS) aircraft typically use either (a) one or more conformal antenna arrays affixed to the exterior of the fuselage or body of the aircraft, (b) one or more linear arrays located in a rotational disk-like structure mounted above the fuselage, where the rotation provides the 360° azimuth coverage required for surveillance applications, or (c) an array located in the nose of the aircraft. The conformal array approach orients the antenna parallel to the longitudinal axis of the aircraft, in which position, generally speaking, the antenna beams point laterally relative to the aircraft. This lateral radar coverage makes forward-looking performance difficult to obtain. The rotating-disk technique suffers from aerodynamic limitations, and an antenna contained in such a disk cannot be as large as might be desired to achieve the desired beamwidth(s). The nose location severely limits the possible aperture of the antenna and therefore limits the beamwidth.

Improved or alternative airborne radar arrangements are desired.

SUMMARY

A radar system comprises first and second point sources. The point sources may transmit mutually orthogonal waveforms. The radar system includes first and second line arrays of receive antennas for receiving radar return signals originating with the point sources, the first and second line arrays being separated by a gap. A digital multiple-input multiple-output (MIMO) processor coheres the arrays across the gap. In a particular embodiment, the first and second line arrays of receive antennas are mutually coaxial. In another embodiment, the gap between the first and second line arrays of receive antennas is no larger than the length of one of the first and second line arrays of receive antennas. The radar system may be associated with an aircraft including first and second wings and a fuselage separating the first and second wings, and in this embodiment the first and second line arrays of receive antennas lie generally along the first and second wings, respectively, with the fuselage occupying at least a portion of the gap.

A radar method according to an aspect of the disclosure comprises the steps of transmitting from first and second point sources, and receiving radar return signals originating with or from the point sources with first and second line arrays of receive antennas separated by a gap. The step of transmitting may include the step of transmitting mutually orthogonal waveforms from the first and second point sources. The method may further include the step of performing multiple-input multiple-output digital processing for cohering the arrays across the gap. In a particular mode of the method, the step of receiving radar return signals originating from the point sources with first and second line arrays of receive antennas separated by a gap includes the step of receiving radar return signals originating from the point sources. The step of receiving radar return signals may include the step of receiving radar return signals with first and second mutually coaxial arrays of receive antennas separated by a gap. In a particularly advantageous mode, the gap is no larger than the length of one of the first and second line arrays of receive antennas. The method may include the step of associating the first and second point sources, the first and second arrays, and the MIMO processor with an aircraft including a first wing bearing the first array, a second wing bearing the second array, and a fuselage separating the first and second arrays.

An aircraft-mounted radar system comprises an airplane defining first and second spaced-apart wings. A line receiving antenna array includes first and second separate receiving antenna array portions, which first and second portions lie mutually coaxially along respective ones of the wings. Each separate portion of the receiving antenna array defines an inside edge separated from the inside edge of the other array portion by a gap. The gap may be occupied by a fuselage of the aircraft. The radar system includes a line transmitting antenna array lying along an axis parallel with the axes of the receiving antenna array portions. A transmitter is coupled to the antennas of the transmitting antenna array, for exciting the antennas of the transmitting array with mutually orthogonal signals. A multiple-input multiple-output processor is coupled to the transmitter and to the receiving antenna array, for processing received signals for forming an effective array including real or physical elements, and also including virtual elements occupying positions along the gap.

A radar system comprises a first antenna array, which may be a line array, and includes antenna elements extending generally horizontally along a line, and having a first extent. A second antenna array, which may be a line array, includes antenna elements extending along the line, and has a second extent, which need not be the same as the first extent. The second antenna array is separated from the first antenna array by a distance no greater than the length of the larger extent, thereby defining an inside end of each of the first antenna array and the second antenna array. The radar system also comprises a first transmit antenna and second transmit antenna. The first transmit antenna lies in a vertical plane passing through the inside end of the first antenna array. The second transmit antenna lies in a vertical plane passing through the inside end of the second antenna array. The first and second transmit antennas lie in the same horizontal plane. The radar system also includes first and second transmitters for generating mutually orthogonally modulated RF signals. The first and second transmitters are coupled to the first and second transmit antennas, for transmitting first and second mutually orthogonal electromagnetic signals from the first and second transmit antennas. The radar system further includes first and second receiver arrays coupled to the first and second antenna arrays and to the first and second transmitters, for processing reflected signals for generating downconverted (baseband or intermediate frequency) first and second received signals from each of the elements of the first and second antenna arrays, respectively. Each of the downconverted received signals includes components attributable to the first and second mutually orthogonal electromagnetic signals. First and second processors are coupled to the first and second receiver arrays, respectively, and to the first and second transmitters, for processing the first and second downconverted signals to separate the first and second mutually orthogonal components of the received signals. A beamforming processor is coupled to the first and second processors for coherently combining the first components of the mutually orthogonal received signals with the second components of the mutually orthogonal received signals to thereby define at least a first beam.

A radar system according to another aspect of the disclosure comprises a first antenna array (which may include elements in a line array or in a planar array) extending along a line, and having a length, at least in a horizontal plane. The radar system also includes a second antenna array extending along the line, and having the length. The second array is separated from the first array by a distance no greater than the length, thereby defining an inside end of the first antenna array and an inside end of the second antenna array. The radar system also includes first and second transmit antennas, the first transmit antenna lying in a vertical plane passing through the inside end of the first antenna array, and the second transmit antenna lying in a vertical plane passing through the inside end of the second antenna array. The first and second transmit antennas lie at the same distance from the horizontal plane. The radar system also includes first and second transmitters for generating mutually orthogonal RF signals. The first and second transmitters are connected to the first and second transmit antennas, for transmitting first and second mutually orthogonal electromagnetic signals from each of the first and second transmit antennas. First and second receiver arrays are coupled to the first and second antenna arrays, for processing reflected signals for generating first and second received signals from each of the first and second antenna arrays, respectively, each of the received signals including components attributable to the first and second mutually orthogonal electromagnetic signals. First and second orthogonal separation processor arrays are coupled to the first and second receiver arrays, respectively, for processing the first and second received signals to separate the first and second components of the mutually orthogonal received signals. A beamforming processor is coupled to the first and second orthogonal separation processor arrays for coherently combining the first components of the mutually orthogonal received signals with the second components of the mutually orthogonal received signals to thereby define a first beam. A particularly advantageous embodiment of this radar system further comprises a radar control processor coupled to the second processor for adjusting the weighting of the coherent combining to thereby shape the first beam.

DESCRIPTION

Figure 1:
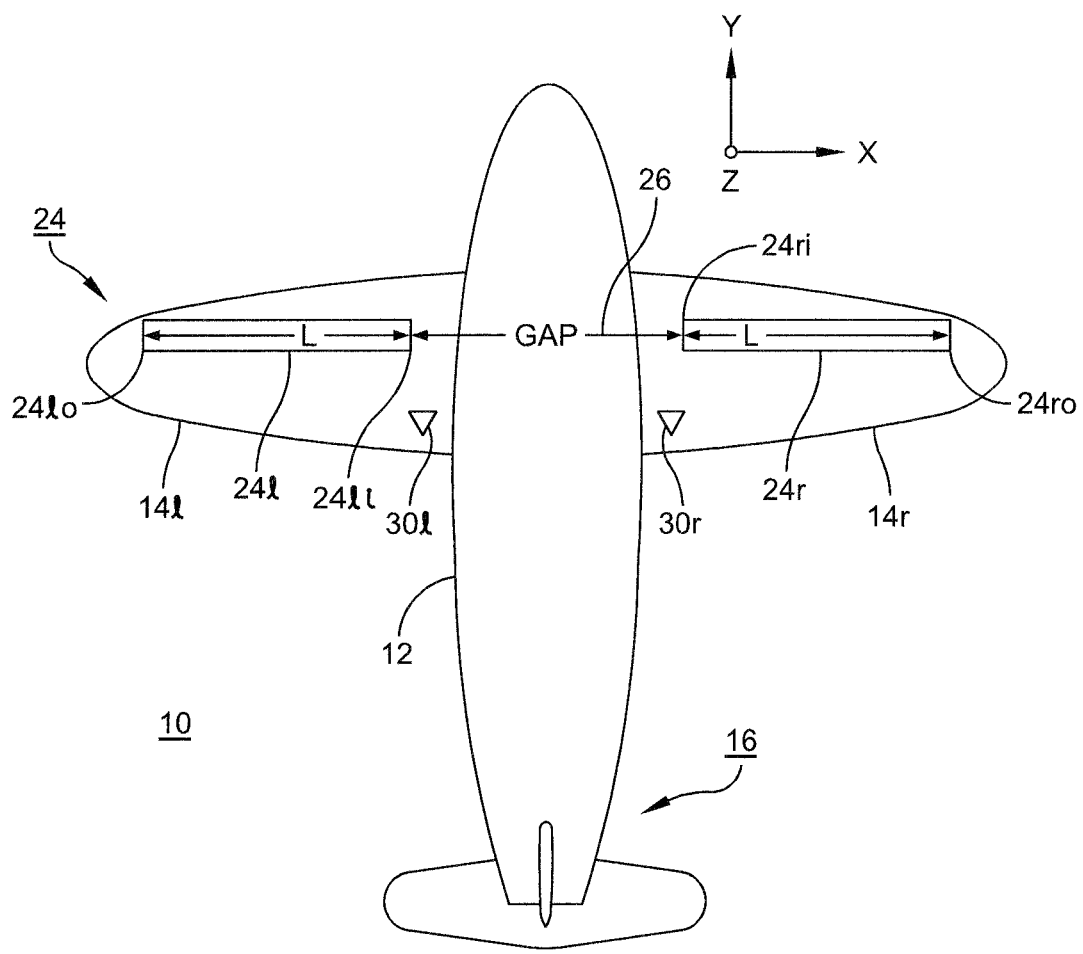
FIG. 1 is a simplified plan view of an aircraft including a fuselage, left and right wings each bearing a receive antenna array and transmit horn, with a gap lying between the antenna arrays, and showing Cartesian coordinates associated with the aircraft.

The description herein includes relative placement or orientation words such as "top," "bottom," "up," "down," "lower," "upper," "horizontal," "vertical," "above," "below," as well as derivative terms such as "horizontally," "downwardly," and the like. These and other terms should be understood as to refer to the orientation or position then being described, or illustrated in the drawing(s), and not to the orientation or position of the actual element(s) being described or illustrated. These terms are used for convenience in description and understanding, and do not require that the apparatus be constructed or operated in the described position or orientation.

Terms concerning attachments, couplings, and the like, such as "connected," "attached," "mounted," refer in a mechanical context to relationships in which structures are secured or attached to one another either directly or indirectly through intervening structures, as well as both movable and rigid attachments or relationships, unless expressly described otherwise. In an electrical context, such terms have a meaning which includes both direct electrical connection and connection through intermediate elements.

FIG. 1 is a simplified plan view of an aircraft 10 including a fuselage or body 12 and left and right wings 14*l* and 14*r*, respectively. A tail assembly is illustrated as 16. Coordinates in the X, Y, and Z direction are indicated. According to an aspect of the disclosure, left and right wing antenna arrays 24E and 24*r*, respectively, extend along the lengths of the right and left wings 14*l* and 14*r*, respectively. The wing antenna arrays 24 are illustrated as elongated rectangles of length L to indicate their general locations and sizes. The antenna arrays may be mounted forward on the wings, or on the top or on the bottom, but must in any case have unobstructed views in the forward, upward, or downward directions respectively, depending on the region to be covered by the radar.

Figure 2:
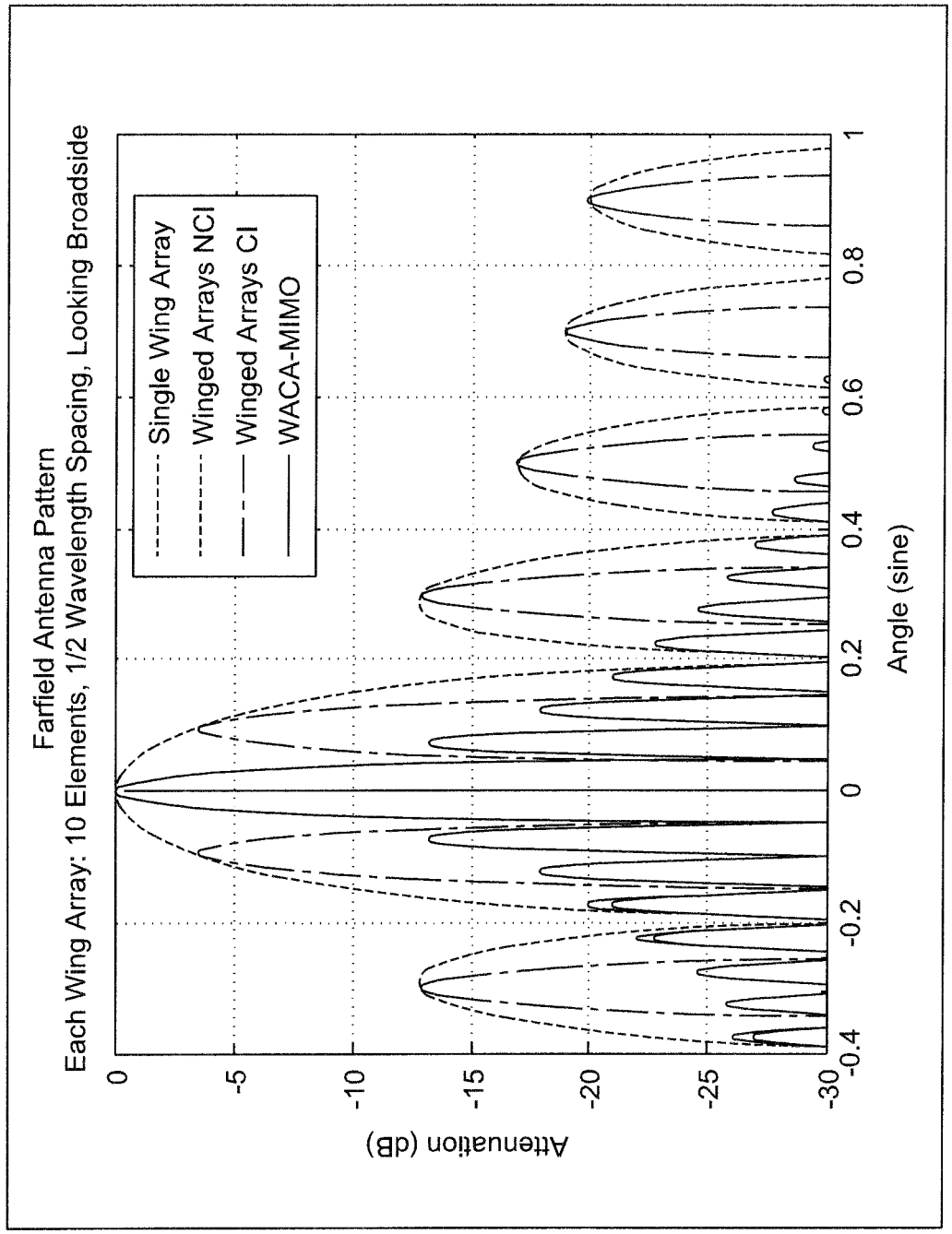
FIG. 2 shows plots of beamwidth resulting from various types of integration using the wing array(s) of FIG. 1.

FIG. 2 is a conventional amplitude (dB) versus scan angle plot (in sines) illustrating the farfield radiation pattern of the antenna arrays 24 of FIG. 1 under the condition that each array, 24*l* and 24*r*, has a length of five wavelengths. More particularly, dotted-line plot 210 of FIG. 2 shows the antenna beam response for one of the wing arrays of FIG. 1, taken alone. As illustrated, antenna beam 210 has a 3 dB beamwidth of about 0.178 sines, corresponding to a full beamwidth of about 10.2°. If the signals of both right and left arrays 24*l* and 24*r* were to be noncoherently combined as required to avoid grating lobes in the presence of the gap 26, the resulting beamwidth for the two wing arrays 24*l* or 24*r* of FIG. 1 would be the same as that of a single wing array, albeit with higher or greater magnitude.

Unfortunately, no array exists in the gap or interstice 26 between the "near" or "inside" ends 24*l* and 24*ri* of the left and right arrays 24*l* and 24*r*, respectively, of FIG. 1. The presence of the fuselage 12 prevents the physical placement of a central array which might extend the effective length of the two wing arrays 24. It is possible to coherently integrate (CI) the two arrays, yielding a tighter beam pattern (0.048 sines, 2.8°), as illustrated by dot-dash plot 212 in FIG. 2; however, grating lobes exist near the main beam. If it were possible to extend the two wing arrays of set 24 of wing arrays of FIG. 1 so as to close the gap 26, the antenna beam pattern would be improved. Using the Winged Aircraft Cohered Arrays Multiple Input Multiple Output (WACA-MIMO) approach, which includes utilizing two transmit arrays, it is possible to achieve an improved beam pattern (0.044 sines, 2.5°) that is also grating lobe free, as illustrated by solid-line plot 214 in FIG. 2. The WACA-MIMO approach includes utilizing two transmit arrays, 30*l* and 30*r*, as illustrated in FIG. 1. Plot 214 has a 3 dB beamwidth of 2.5°, which is superior to any of the other integrated beamwidths of FIG. 2.

The combination of the geometric configuration with MIMO processing enables a virtual array to be created across the physically-obstructed fuselage. The configuration or method is termed Winged Aircraft Cohered Arrays Multiple-Input-Multiple-Output, or WACA-MIMO for short. Freedom exists to make the arrays, both for transmit and receive, of shapes other than line arrays, as for example planes or warped planes (three-dimensional shapes) in order to create more complex WACA-MIMO configurations.

According to an aspect of the disclosure, the gap between the two wing arrays of set 24 of wing arrays is synthetically filled so as to obtain an effective array length which is greater than the physical extent of the physical arrays. This is accomplished, in part, by Multiple-Input, Multiple-Output (MIMO) signal processing to generate virtual arrays using receive wing arrays with transmit antennas to form virtual arrays larger than the physical extent of the arrays. Thus, a transmitter array of M elements when MIMO combined with a receiver array of N elements forms or defines a virtual array of NM elements, not N+M elements. The spatial resolution for clutter is the same as that of a receiving array with NM physical elements. Put another way, NM degrees of freedom can be achieved or created using only N+M elements.

Figure 3A:
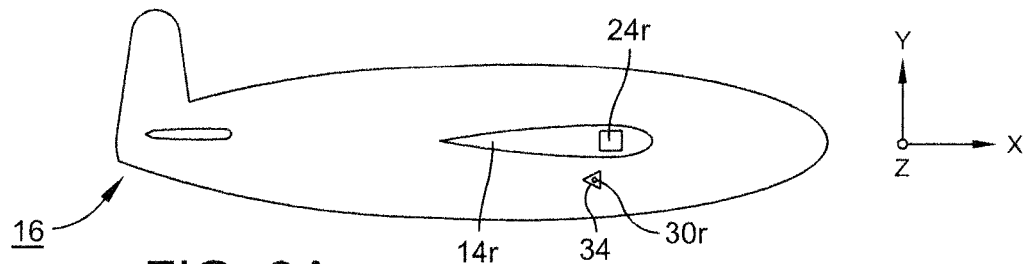
FIGS. 3A, 3B, and 3C are right elevation, front elevation, and plan views, respectively, of the aircraft of FIG. 1, showing some details of the location of certain antennas.
Figure 3B:
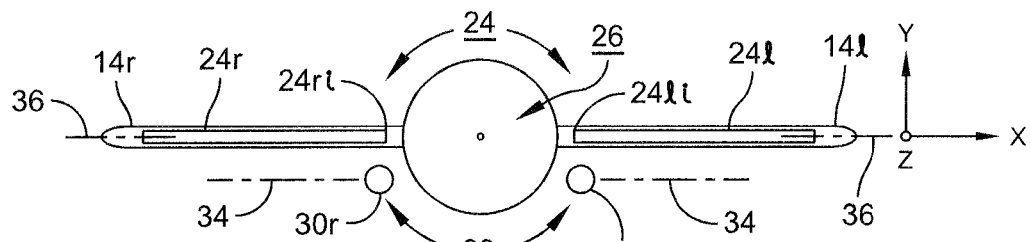
Figure 3C:
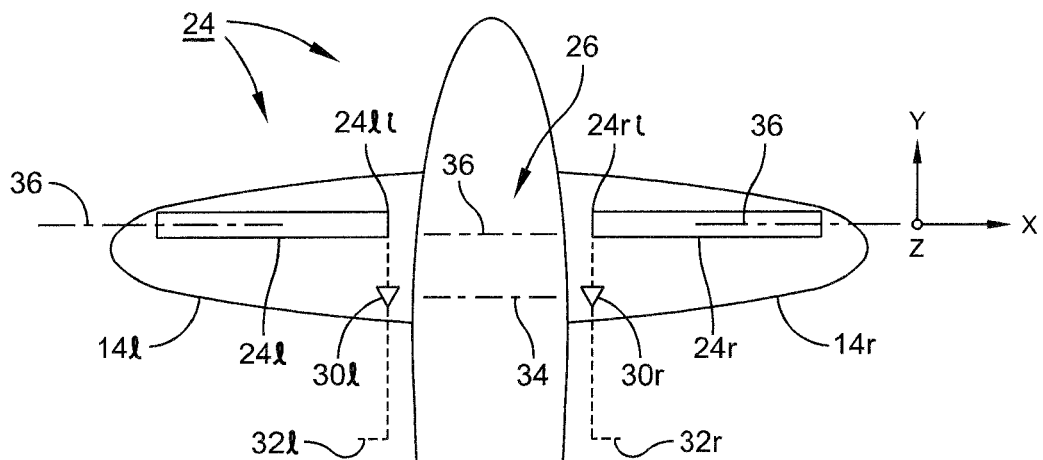
Figure 3D:
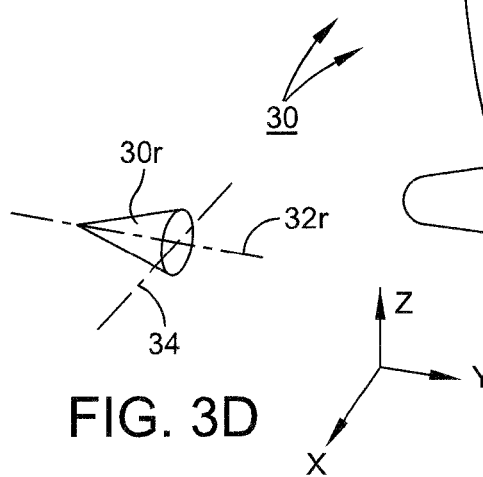
FIG. 3D is a simplified perspective or isometric view of one of the antennas of FIG. 3A, 3B, or 3C.

According to an aspect of the disclosure, the transmit array is made up of antenna elements, which are termed "horns" or 'transmit horns" for ease of explanation; FIG. 3D is a simplified illustration of a horn antenna. These horns are shown as point sources (i.e., single antenna elements) but can be either line or 2-D arrays. Similarly, the receive arrays are shown as line arrays but can be either single elements or 2-D arrays. The locations of the transmit horns are selected as described in conjunction with FIGS. 3A, 3B, and 3C. FIGS. 3A, 3B, and 3C are simplified illustrations of the shape of an aircraft and the locations of some of the antennas according to aspects of the disclosure. Each of FIGS. 3A, 3B, and 3C is marked with X, Y, and Z coordinates. As illustrated in FIGS. 3A, 3B, and 3C, the receive antenna arrays 24*l* and 24*r* lie along a line 36 extending through the wings 24*l* and 14*r*, respectively, and parallel with the X or –X axis. The transmit horns or antennas 30*l* and 30*r* are both located on a line 34 which is parallel with the X or –X axis. The transmit horns and the receive arrays are free to move parallel with Y-Z plane, so long as the transmit horns lie in the same line parallel with the X or –X axis (line 34) and the receive arrays lie in the same line parallel with the X or –X axis (line 36); the receive arrays need not lie in the same line as the transmit horns. The transmit and receive antennas must have an unobstructed view in the desired direction, which would ordinarily be in the forward or downward directions. In FIG. 3B, the transmit horns 30*l* and 30*r* lie in the same Y-X plane and have the same Z offsets. In FIG. 3C, the transmit horns 30*l* and 30*r* lie in the same plane parallel with the X-Y plane and have the same Y-offset; also, the receive arrays and elements lie in the same plane parallel with the X-Y plane, and have the same Z offset. These locations are those suited to forward direction, upward or downward search. Scan in other orthogonal directions may require other orientations of the antenna arrays, which should be apparent to those skilled in the art based on the teachings herein.

Figure 4A:
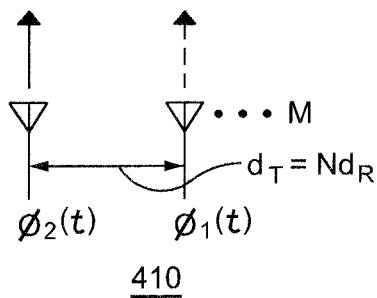
FIG. 4A illustrates a notional transmit antenna configuration with mutually orthogonally coded signals from each transmit source.
Figure 4B:
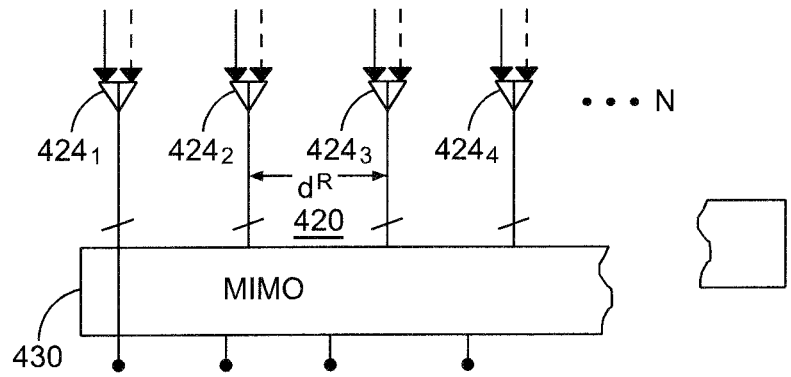
FIG. 4B illustrates a notional receive antenna array receiving reflected encoded signals originating from the transmit array of FIG. 4A.
Figure 4C:
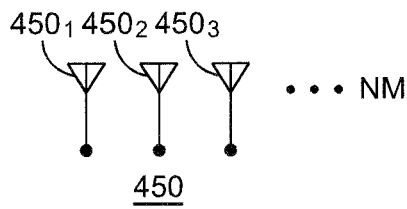
FIG. 4O illustrates the effective receive antenna array arising from MIMO processing.

According to aspects of the disclosure, the radar antennas and arrays of FIGS. 3A, 3B, and 3C are cohered to provide a combined radiation pattern without grating lobes. The radar antennas and arrays of FIGS. 3A, 3B, and 3C are made a part of two digital array radars (DARs) with arrays 24*l* and 24*r* each of length L, with the arrays 24*l* and 24*r* separated by a gap 26, also of length L. Transmit horn 30*l* lies in an axis illustrated as 32*l* in FIG. 3C, which axis 32*l* lies parallel with the Y axis plane and which passes through the "inside" end 34*li* of the left receive array 24*l*. The inside end of the array is that end nearest the fuselage 12. Similarly, horn 30*r* lies in an axis illustrated as 32*r*, which axis 32*r* lies parallel with the Y axis and which passes through the inside end 24*ri* of the right receive array 24*r*. Clearly, planes 32*l* and 32*r* are mutually parallel. Mutually orthogonal waveforms are transmitted in a generally forward direction by each of the transmit antennas 30*l* and 30*r*, so that the DAR arrangement can operate in Multiple-Input, Multiple-Output (MIMO) mode. Each receive antenna array 24*l*, 24*r* receives reflections from targets illuminated by each of the transmit horns. Since the waveforms transmitted by each transmit horn 30*l*, 30*r* are mutually orthogonal, the signals received by each receive array 24*l*, 24*r* can be separated to separately operate on the transmitted signals. Because the path from each transmitter to each receiver can be isolated, virtual elements can be created at the center of each transmit-receive pair. FIGS. 4A, 4B, and 4C show the combinations of these antenna arrays. FIG. 4A illustrates an arrangement 410 with two real or physical transmit antennas 30*l* and 30*r*, spaced from each other by a distance $d_T = N d_R$, transmitting mutually orthogonal signals $\phi_2(t)$ and $\phi_1(t)$ respectively. Signal $\phi_1(t)$ transmitted from antenna 30*r* is represented by a dashed line, while $\phi_2(t)$ transmitted from antenna 30*l* is represented by an unbroken line. FIG. 4B illustrates an arrangement 420 including a MIMO (Multiple-input, multiple-output) processor 430 and a set 424 of real or physical receive antenna elements designated $424_1$, $424_2$, $424_3$, $424_4$, ... $424_N$. Antenna elements $424_1$, $424_2$, $424_3$, $424_4$, ... $424_N$ represent actual or physical elements of arrays 24*l* and of array 24*r*. FIG. 4C illustrates a virtual antenna line array designated generally as 450 and including virtual antenna elements designated $450_1$, $450_2$, $450_3$, ... $450_{MN}$. As indicated in FIG. 4C, virtual antenna element $450_1$ is synthesized from transmit antenna 30*l* and receive antenna $424_1$, virtual antenna element $450_2$ is synthesized from transmit antenna 30*l* and receive antenna $424_2$, virtual antenna element $450_3$ is synthesized from transmit antenna 30*l* and receive antenna $424_3$, virtual antenna element $450_{N+1}$ is synthesized from transmit antenna 30*r* and receive antenna $424_1$, virtual antenna element $450_{N+2}$ is synthesized from transmit antenna 30*r* and receive antenna $424_2$, and virtual antenna element $450_{N+3}$ is synthesized from transmit antenna 30*r* and receive antenna $424_3$. Thus, each virtual element of FIG. 4C may be viewed as being made up from, or as being formed by, one transmit element and one receive element. The position of each virtual element is at the midpoint of the line segment joining the transmit and receive elements which make it up. Virtual antenna 450 of FIG. 4C has twice the angular resolution of a real or physical antenna array of similar size. This is a result of the fact that each virtual element has a unique transmit-element-to-receive-element path, thereby making the phase shift delta between virtual elements (which determines the angular resolution) depend on the round-trip path length as opposed to the usual one-way distance for a regular phased array.

FIGS. 4A, 4B, and 4C together illustrate a principle that underlies an aspect of the disclosure. More particularly, FIG. 4A illustrates a transmit antenna array 410 with M elements driven by a plurality of sources, each with mutually orthogonal codings, which are represented by paths designated by dotted lines, dash lines, and chain (dot-dash) lines. The separation between the transmit antenna elements of FIG. 4A is $d_T=Nd_R$. The mutually orthogonal signals, as known, are capable of separation without interference. FIG. 4B illustrates a receive antenna array 420 including N elements, with inter-element spacing of $d_R$. The two mutually orthogonal signals transmitted by elements in 410 reflect from a target and enter the receive antenna array 420. The mutually orthogonal signals are separated, and flow to a MIMO processor 430 by way of multiple signal paths. As an alternative, the received signals may be coupled directly to MIMO processor 430 for separation and beamforming. The spatial resolution of the receive array for clutter under this condition is the same as that of a receive array of NM elements. That is, NM degrees of freedom can be achieved with only N+M elements.

Figure 5:
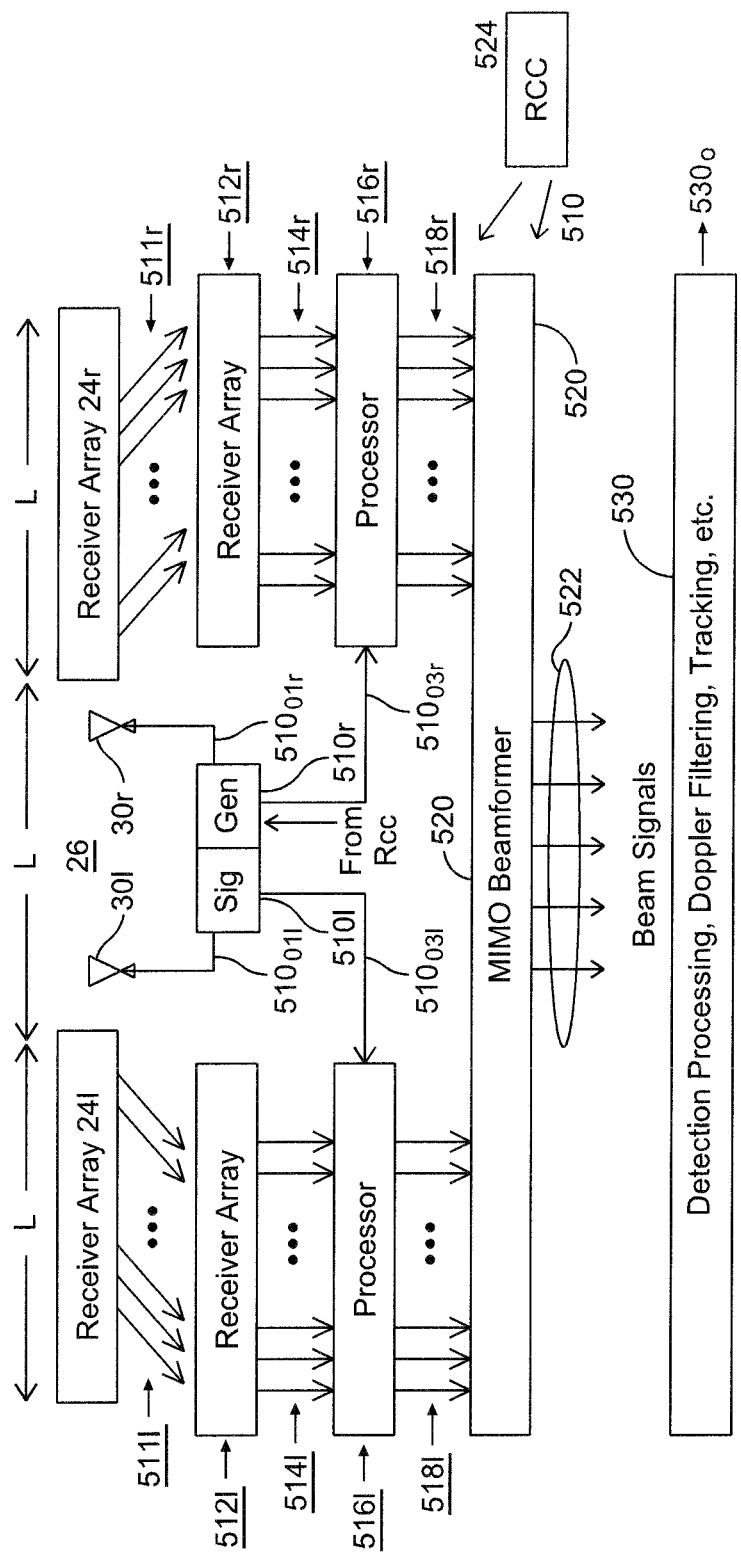
FIG. 5 is a simplified block diagram of an airborne radar system according to aspects of the disclosure.

FIG. 5 is a simplified block diagram of an aircraft 10 with a digital array radar system (DAR) 8 according to an aspect of the disclosure. In FIG. 5, elements corresponding to those of other FIGURES are designated by like reference alphanumerics. In FIG. 5, the receive antenna arrays 24l and 24r are of length L, and are separated by a gap 26, also of length L. Each antenna element of left array 24l communicates by a separate path (which in the case of digital signals may include plural bit paths) with an individual receiver (not separately illustrated) of a set or array 512l of receivers. The set of paths is designated 511l. Similarly, each antenna element of right array 24r communicates by a separate path of a set 511r with an individual receiver (not separately illustrated) of a set or array 512r of receivers. Also in FIG. 5, a first transmit antenna or horn 30l is driven from an output port 510o1l of a transmitter 510l with Radio Frequency (RF) electromagnetic signal or pulses modulated by a first code of a pair of mutually orthogonal codes. Second transmit antenna or horn 30r is driven from an output port 510o1r of transmitter 510r with electromagnetic signal at the same frequency and modulated by a second code of the mutually orthogonal pair.

The mutually-orthogonally-modulated signals transmitted by transmit horns 30l and 30r of FIG. 5 reflect from targets which happen to be in the search volume, and the reflected signals or reflections are received by the individual antenna elements of the receive antenna arrays 24l and 24r. The received signals flow from the individual elements of array 24l by way of paths illustrated as 511l to individual receivers of an array 512l of receivers, and the received signals flow from the elements of array 24r by way of paths illustrated as 511r to individual receivers of an array 512r of receivers. Receivers 512l and 512r also receive phase-controlled samples of the carrier RF signal, and downconvert to baseband or to intermediate frequency (IF) the received signals. Thus, the signals appearing at the output signal paths 514l and 514r represent the downconverted received signals, modulated by both of the mutually orthogonal signals. The downconverted signals are applied from receiver array 512l by way of paths 514l to a processor (Proc) array 516l, and the downconverted signals are applied from receiver array 512r by way of paths 514r to a processor (Proc) array 516r. Processor array 516l receives the first and second codes of the mutually orthogonal pair by way of path 510o3l, and processor array 516r receives the first and second codes of the mutually orthogonal pair by way of path 510o3r. Processors shown in the FIGURES are in separate blocks only for logical, conceptual, or explanatory grouping purposes.

Processor array 516l of FIG. 5 separates the signals received by the left antenna array 24l for each code impressed on the signal, corresponding to the transmitter antenna from which the signal originated. It does this by deeming that component of the received signal which is encoded with the first code to have originated from transmit horn 30l, and that component of the received signal which is encoded with the second code to have originated from transmit horn 30r. Similarly, processor array 516r separates the signals received by the right antenna array 24r depending upon the transmitter antenna from which the signal originated. It does this by deeming that component of the received signal which is encoded with the first code to have originated from transmit horn 30l, and that encoded with the second code to have originated from transmit horn 30r. The processed received signals are coupled from processors 516l and 516r by way of paths 518l and 518r to a beamforming processor or beamformer 520. Beamformer 520 forms beam signals through the use of analog or digital beamforming (DBF) in a known fashion and produces the beam signals on a set of paths 522. The beam signals are applied by way of paths 522 to conventional radar processing illustrated as a block 530, which produces conventional radar signals at output ports illustrated as 530o. Radar Control Computer (RCC) 524 performs the usual functions of synchronizing the operation of the various parts of the radar system and establishing the operating parameters, 510, including the operating frequency, repetition rate, pulse width or duration, the number and direction(s) of the antenna beams, pulse compression coding, receive sampling rate, amplifier gains, and the like.

The RCC 524 of FIG. 5 also establishes the weighting of the signals transduced by the antenna elements of antenna array so as to shape the beam and establish the sidelobe level, as is well known in the antenna arts.

The beam(s) produced by MIMO beamformer 520 of FIG. 5 will have improved angular resolutions, as described in conjunction with FIG. 2, regardless of the post-processing (e.g., Detection Processing, Doppler Filtering, Tracking) which is performed by the remaining portion of the radar system.

Figure 6:
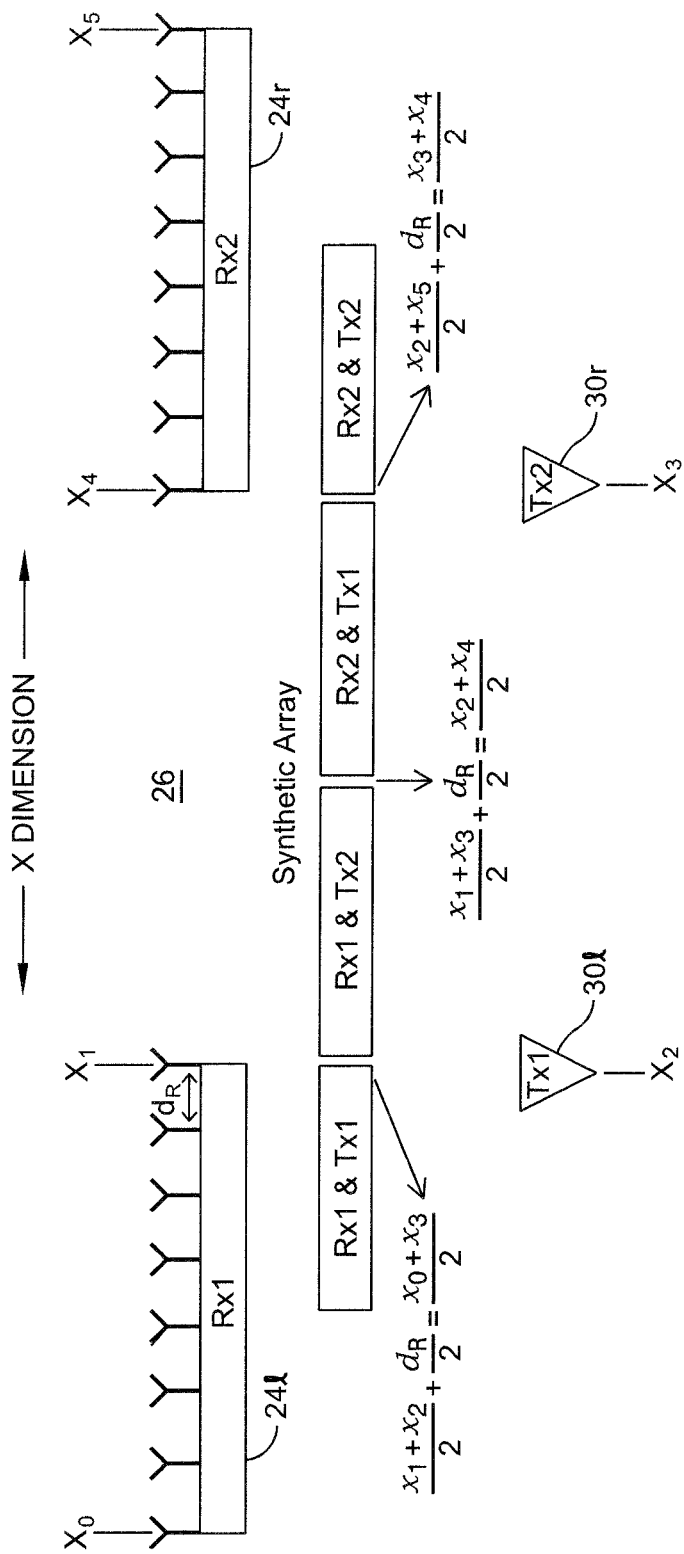
FIG. 6 is a notional illustration of a system geometry according to an aspect of the disclosure using left and right transmit antennas and left and right receive antenna arrays.

FIG. 6 illustrates in notional form the left (Rx1) and right (Rx2) receive arrays 24l and 24r, respectively. The spacing between elements of the receive antenna arrays is designated $d_R$. The left-most antenna element of array 24l is marked with its x-position $x_0$, and the right-most antenna element of left array 24l is marked with x-position $x_1$. The left-most antenna element of right receive array 24r is marked as being at x-position $x_4$, separated from the position $x_1$ of the right-most element of left array 24l by the gap 26. The right-most antenna element of right array 24r is marked with x-position $x_5$. The lengths of the left array 24l, gap 26, and right array 24r are each given by length L. The X-position of the left transmit antenna (Tx1) 30l is designated $x_2$ and that of the right transmit antenna (Tx2) 30r is designated $x_3$. There should be no overlap of the synthetic elements, which can limit the length of the synthetic array. Satisfying the following equations provides a satisfactory configuration:

$$\frac{x_1+x_2}{2}+\frac{d_R}{2}=\frac{x_0+x_3}{2}$$

$$\frac{x_1+x_3}{2}+\frac{d_R}{2}=\frac{x_2+x_4}{2}$$

$$\frac{x_2+x_5}{2}+\frac{d_R}{2}=\frac{x_3+x_4}{2}$$

A radar system 10 according to an aspect of the disclosure comprises first 30l and second 30r point sources transmitting electromagnetic waveforms (from 510), and first 24*l* and second 24*r* line arrays of receive antennas for receiving radar return signals originating with the point sources, the first and second line arrays being separated by a gap 26. A digital multiple-input multiple-output (MIMO) processor 512, 516, 520 processes the signals received by the elements of the line arrays to cohere the arrays across the gap 26. In a preferred embodiment, mutually orthogonal waveforms are transmitted by the point sources. In a particular embodiment, the first 24*l* and second 24*r* line arrays of receive antennas are mutually coaxial. In another embodiment, the gap 26 between the first 24*l* and second 24*r* line arrays of receive antennas is no larger than the length of one of the first and second line arrays of receive antennas. The radar system may be associated with an aircraft 8 including first and second wings and a fuselage separating the first and second wings, and in this embodiment the first and second line arrays of receive antennas lie generally along the first and second wings, respectively, with the fuselage occupying at least a portion of the gap.

A radar method according to an aspect of the disclosure comprises the steps of transmitting mutually orthogonal waveforms from first 30*l* and second 30*r* point sources, and receiving radar return signals originating with or from the point sources 30*l*, 30*r* with first 24*l* and second 24*r* line arrays of receive antennas separated by a gap 26. The method further includes the step of performing multiple-input multiple-output (MIMO) digital processing 520 for cohering the arrays 24*l*, 24*r* across the gap 26. In a particular mode of the method, the step of receiving radar return signals originating with or from the point sources 30*l*, 30*r* with first 24*l* and second 24*r* line arrays of receive antennas separated by a gap 26 includes the step of receiving radar return signals originating with or from the point sources 30*l*, 30*r* with first 24*l* and second 24*r* mutually coaxial arrays of receive antennas separated by a gap 26. In a particularly advantageous mode, the gap 26 is no larger than the length of one of the first 24*l* and second 24*r* line arrays of receive antennas. In a most advantageous mode, the step of associating the first and second point sources 30*l*, 30*r*, the first and second arrays 24*l*, 24*r*, and the MIMO processor 520 with an aircraft 10 including a first wing 14*l* bearing the first array 24*l*, a second wing 14*r* bearing the second array 24*r*, and a fuselage 12 separating the first 24*l* and second 24*r* arrays.

An airborne radar system 10 according to an aspect of the disclosure comprises an airplane 8 defining a first 14*l* and second 14*r* spaced-apart wings. A line receiving antenna array 24 includes first 24*l* and second 24*r* separate receiving antenna array portions. The receiving antenna array portions lie mutually coaxially 36 along the wings 14*l*, 14*r*. Thus, the line receiving array 24 includes two separate, mutually coaxial (36) 36 line receiving array portions 24*l* and 24*r*. Each separate portion 24*l*, 24*r* of the receiving antenna array 24 defines an inside edge 24*l*, 24*r* separated from the inside edge 24*li*, 24*ri* of the other array portion by a gap 26. The radar system 10 includes a line transmitting antenna array 30 lying along an axis 34 parallel with the axes 36 of the receiving antenna array portions 24*l*, 24*r*. A transmitter 510*l*, 510*r* is coupled to the antennas 30*l*, 30*r* of the transmitting antenna array 30, for exciting the antennas 30*l*, 30*r* of the transmitting array 30 with mutually orthogonal signals. A multiple-input multiple-output processor 520 is coupled to the transmitter 510*l*, 510*r* and to the receiving antenna array 24, for processing received signals for forming an effective array including real or physical elements (antenna sets 410 and 424) and also including virtual elements (set 450) occupying positions along the gap 26.

A radar system 10 according to an aspect of the disclosure comprises a first antenna array 24*l*, which may be a line array, including antenna elements extending generally horizontally along a line 36, and having a first extent ($x_0$ to $x_i$). The line array may be a portion of a two-dimensional array. A second antenna array 24*r*, which may be a line array, includes antenna elements extending along the line 36, and has a second extent ($x_4$ to $x_5$), which need not be the same as the first extent. The radar system 10 also comprises a first transmit antenna 30*l* and second transmit antenna 30*r*. The first transmit antenna 30*l* lies in a vertical (parallel with the YZ plane) plane 32*l* passing through the inside end 24*li* of the first antenna array 24*l*. The second transmit antenna 30*r* lies in a vertical (parallel with the YZ plane) plane 32*r* passing through the inside end 24*ri* of the second antenna array 24*r*. The first 30*l* and second 30*r* transmit antennas lie in the same horizontal plane 34. The radar system 10 also includes first 510*l* and second 510*r* transmitters for generating mutually orthogonal RF signals, the first 510*l* and second 510*r* transmitters being connected to the first 30*l* and second 30*r* transmit antennas, for transmitting first and second mutually orthogonal electromagnetic signals from the first 30*l* and second 30*r* transmit antennas, respectively. The radar system 10 further includes first 512*l* and second 512*r* receiver arrays coupled to the first 24*l* and second 24*r* antenna arrays and to the first 510*l* and second 510*r* transmitters, for processing reflected signals for generating downconverted received (baseband or intermediate frequency) first and second received signals from each of the elements of the first 24*l* and second 24*r* antenna arrays, respectively. Each of the downconverted received signals includes components attributable to the first and second mutually orthogonal electromagnetic signals. First 516*l* and second 516*r* processors are coupled to the first 512*l* and second 512*r* receiver arrays, respectively, and to the first 510*l* and second 510*r* transmitters, for processing the first and second downconverted signals to separate the first and second components of the mutually orthogonal received signals. A beamforming processor 520 is coupled to the first 516*l* and second 516*r* processors for coherently combining the first components of the mutually orthogonal received signals with the second components of the mutually orthogonal received signals to thereby define at least a first beam. In a particular embodiment, an airplane 10 including first 14*l* and second 14*r* wings separated by a fuselage 12 is associated with the radar, the first antenna array 24*l* lies along the first wing 14*l*, and the second antenna array (24*r*) 24*r* lies along the second wing 14*r*, with the first 24*l* and second 24*r* arrays separated by a gap 26 at the location of the fuselage 12. In this embodiment, the vertical (YZ) planes through which the third and fourth antennas lie pass through the inside ends 24*l*, 24*r* of the first 24*l* and second arrays 24*r*, respectively.

A radar system 10 according to another aspect of the disclosure comprises a first antenna array 24*l* (which may include elements in a line array or in a planar array) extending along a line 36, and having a length (L). The radar system 10 also includes a second antenna array 24*r* extending along the line 36, and having the length (L). The second array is separated from the first array by a distance no greater than the length (L), thereby defining an inside end 24*li* of the first antenna array 24*l* and an inside end 24*ri* of the second antenna array 24*r*. Outside end 24*lo* of the first antenna array 24*l* and outside end 24*ro* of the second antenna array 24*r* are also defined. The radar system 10 also includes first 30*l* and second 30*r* transmit antennas, the first transmit antenna 30*l* lying in a vertical plane (parallel with the YZ axis) passing through the inside end 24*li* of the first antenna array 24*l*, and the second transmit antenna 30r lying in a vertical plane (parallel with the YZ plane) passing through the inside end 24ri of the second antenna array 24i. The first 30l and second 30r transmit antennas lie at the same distance from the horizontal (XY) plane. The radar system—10 also includes first 510l and second 510r transmitters for generating mutually orthogonal RF signals. The first 510l and second 510r transmitters are connected to the first 30l and second 30r transmit antennas, for transmitting first and second mutually orthogonal electromagnetic signals from the first 30l and second (30f) 30r transmit antennas, respectively. First 512l and second 512r receiver arrays are coupled to the first 24l and second 24r antenna arrays, for processing reflected signals for generating first and second received signals (such as downconverted or baseband signals) from each of the first 24l and second 24r antenna arrays, respectively, each of the received signals including components attributable to the first and second mutually orthogonal electromagnetic signals. First 516l and second 516r orthogonal separation processor arrays are coupled to the first 512l and second 512r receiver arrays, respectively, for processing the first and second received signals to separate the first and second components of the mutually orthogonal received signals. A beamforming processor 520 is coupled to the first 516l and second 516r orthogonal separation processor arrays for coherently combining the first components of the mutually orthogonal received signals with the second components of the mutually orthogonal received signals to thereby define a first beam. A particularly advantageous embodiment of this radar system 10 further comprises a radar control processor 524 coupled to the second processor 520 for adjusting the weighting of the coherent combining to thereby shape the antenna beam.

What is claimed is:

1. A radar system, comprising:
   first and second line arrays of receive antennas separated by a gap between an inside edge of the first line array and an inside edge of the second line array;
   first and second antenna point sources transmitting signal waveforms;
   wherein the first and second line arrays of receive antennas receive radar return signals originating with said first and second antenna point sources; and
   a digital processor utilizing multiple-input multiple-output (MNO) techniques for cohering said first and second line arrays of receive antennas to form a virtual array that extends across said gap.

2. A radar system according to claim 1, wherein said signal waveforms transmitted by said first and second point sources are mutually orthogonal.

3. A radar system according to claim 2, wherein said first and second line arrays of receive antennas are mutually coaxial.

4. A radar system according to claim 2, in which the gap between said first and second line arrays of receive antennas is no larger than the length of one of said first and second line arrays of receive antennas.

5. A radar system according to claim 2, further comprising an aircraft including first and second wings and a fuselage separating said first and second wings, and wherein:
   said first and second line arrays of receive antennas lie generally along said first and second wings, respectively, with said fuselage occupying at least a portion of said gap.

6. The system of claim 1, wherein said first point source is proximate to the inside edge of the first line array and the second point source is proximate to the inside edge of the second line array.

7. The system of claim 6, wherein said first point source comprises a first transmission line array and said second point source comprises a second transmission line array.

8. The system of claim 7, wherein said first transmission line array and said second transmission line array are coaxial.

9. The system of claim 8, wherein said first line array and said second line array of receive antennas are coaxial along a first axis and wherein said first transmission line array and said second transmission line array are coaxial on a second axis that is parallel with the first axis.

10. A method for remote sensing,
    comprising the steps of:
    transmitting signal waveforms from first and second antenna point sources;
    receiving radar return signals originating with said point sources with first and second line arrays of receive antennas separated by a gap between an inside edge of the first line array and an inside edge of the second line array; and
    digitally processing said radar return signals for cohering said first and second line arrays of receive antennas to form a virtual array that extends across said gap.

11. A method for remote sensing according to claim 10, wherein said step of transmitting waveforms from the first and second point sources includes the step of transmitting mutually orthogonal waveforms from said first and second point sources, and said step of digitally processing includes multiple-input-multiple-output (MIMO) processing.

12. The method of claim 11, wherein said step of transmitting mutually orthogonal waveforms from said first and second point sources comprises transmitting first and second mutually orthogonal signals;
    wherein said step of receiving radar return signals comprises receiving first and second return signals, each of said return signals including components attributable to said first and second mutually orthogonal signals; and
    wherein said step of digitally processing said radar return signals for cohering said arrays across said gap comprises:
    processing said radar return signals to separate said first and second components of said first and second mutually orthogonal radar return signals; and
    coherently combining said first components of said first components of said first and second mutually orthogonal received signals with said second components of said first and second mutually orthogonal received signals to thereby define a first beam.

13. The method of claim 12, further comprising adjusting the weighting of said coherent combining to thereby shape said first beam.

14. A method for remote sensing according to claim 10, in which said step of receiving radar return signals originating with said point sources with first and second line arrays of receive antennas separated by a gap, includes the step of receiving radar return signals originating with said point sources with first and second line arrays of receive antennas separated by a gap which is no larger than the length of one of said first and second line arrays of receive antennas.

15. An airborne radar system, comprising:
    an airplane defining first and second spaced apart wings;
    a line receiving antenna array including a first portion and a second portion lying mutually coaxially along said wings, said first portion on said first wing and said second portion on said second wing, each of said first portion and said second portion of said receiving antenna array defining an inside edge, said space between the inside edge of each of the first portion and second portion defining a gap;
a line transmitting antenna array including a first portion and a second portion lying along an axis parallel with the axis of the first portion and second portion of the receiving antenna array, the first portion of line transmitting array being proximate to the inside edge of the first portion of the line receiving antenna array, and the second portion of the line transmitting array being proximate to the inside edge of the second portion of the line receiving antenna array;
a transmitter coupled to each of said antennas of said transmitting antenna array, for exciting said antennas of said transmitting array with mutually orthogonal signals; and
a multiple-input multiple-output processor coupled to said transmitter and to said receiving antenna array, for processing received signals for forming an effective array including physical elements and also including virtual elements occupying positions along said gap.

16. A radar system, said radar system comprising:
a first antenna array extending along a line, and having a first extent, at least in a horizontal plane;
a second antenna array extending along said line, and having an extent, which need not be the same as said first extent;
third and fourth antennas, said third antenna lying in a vertical plane passing through an inside end of said first array, and said fourth antenna lying in a vertical plane passing through an inside end of said second array, said third and fourth antennas lying at the same distance from said horizontal plane;
first and second transmitters for generating mutually orthogonal RF signals, said first and second transmitters being connected to said third and fourth antennas, respectively, for transmitting both first and second mutually orthogonal electromagnetic signals from each of said third and fourth antennas;
first and second receiver arrays coupled to said first and second antenna arrays and to said first and second transmitters, for processing reflected signals for generating first and second received signals from each of the elements of said first and second antenna arrays, respectively, each of said first and second received signals including first and second components of mutually orthogonal received signals attributable to said first and second mutually orthogonal electromagnetic signals;
first and second processors coupled to said first and second receiver arrays, respectively, and to said first and second transmitters, for processing said first and second received signals to separate said first and second components of said mutually orthogonal received signals; and
a beamforming processor coupled to said first and second processors for coherently combining said first components of said mutually orthogonal received signals with said second components of said mutually orthogonal received signals to thereby define at least a first beam.

17. A radar system according to claim 16, further comprising an airplane including left and right wings and a fuselage separating said left and right wings, and wherein:
said first antenna array lies along said left wing and defines an inside edge and said second antenna array lies along said right wing and defines an inside edge, said inside edges of said first and second antenna arrays being separated by a gap at the location of said fuselage; and
said vertical plane in which said third antenna lies passes through the inside end of said first array, and said vertical plane in which said fourth antenna lies passes through the inside end of said second array.

18. A radar system, said radar system comprising:
a first antenna array extending along a line, and having a length, at least in a horizontal plane;
a second antenna array extending along said line, and having said length, said second array being separated from said first array by a distance no greater than said length, thereby defining an inside end and an outside end of each of said first and second arrays;
third and fourth antennas, said third antenna lying in a vertical plane passing through said inside end of said first array, and said fourth antenna lying in a vertical plane passing through said inside end of said second array, said third and fourth antennas lying at the same distance from said horizontal plane;
first and second transmitters for generating mutually orthogonal RF signals, said first and second transmitters being connected to said third and fourth antennas, respectively, for transmitting first and second mutually orthogonal electromagnetic signals from said third and fourth antennas, respectively;
first and second receiver arrays coupled to said first and second antenna arrays, for processing reflected signals for generating first and second received signals from each of said first and second antenna arrays, respectively, each of said first and second received signals including first and second components of mutually orthogonal received signals attributable to said first and second mutually orthogonal electromagnetic signals;
first and second processor arrays coupled to said first and second receiver arrays, respectively, for processing said first and second received signals to separate said first and second components of said mutually orthogonal received signals;
a second processor coupled to said first and second processor arrays for coherently combining said first components of said mutually orthogonal received signals with said second components of said mutually orthogonal received signals to thereby define a first beam.

19. A radar system according to claim 18, further comprising a radar control processor coupled to said second processor for adjusting the weighting of said coherent combining to thereby shape said first beam.

20. A radar system according to claim 19, wherein said second antenna array is separated from said first antenna array by a distance equal to said length, thereby defining the inside end and the outside end of each of said first and second antenna arrays.

* * * * *